United States Patent
Ferretti

(10) Patent No.: US 9,817,120 B2
(45) Date of Patent: Nov. 14, 2017

(54) FISH TRACKER

(71) Applicant: The Boeing Company, Chicago, IL (US)

(72) Inventor: Andrea Ferretti, Carrara (IT)

(73) Assignee: THE BOEING COMPANY, Chicago, IL (US)

(*) Notice: Subject to any disclaimer, the term of this patent is extended or adjusted under 35 U.S.C. 154(b) by 703 days.

(21) Appl. No.: 13/948,549

(22) Filed: Jul. 23, 2013

(65) Prior Publication Data

US 2015/0029824 A1 Jan. 29, 2015

(51) Int. Cl.
| | |
|---|---|
| G01S 15/96 | (2006.01) |
| G01S 7/56 | (2006.01) |
| G01S 15/02 | (2006.01) |
| G01S 7/62 | (2006.01) |

(52) U.S. Cl.
CPC .......... *G01S 15/96* (2013.01); *G01S 7/56* (2013.01); *G01S 7/629* (2013.01); *G01S 15/025* (2013.01)

(58) Field of Classification Search
CPC ........ G01S 15/96; G01S 15/025; G01S 7/629; G01S 7/56
See application file for complete search history.

(56) References Cited

U.S. PATENT DOCUMENTS

| | | | | |
|---|---|---|---|---|
| 4,939,661 A * | 7/1990 | Barker et al. | ................. | 701/455 |
| 6,980,484 B2 | 12/2005 | Chen | | |
| 7,006,406 B2 | 2/2006 | Fujimoto et al. | | |
| 2002/0051080 A1* | 5/2002 | Tanaka | ................... | H04N 5/232 |
| | | | | 348/552 |
| 2006/0018197 A1 | 1/2006 | Burczynski et al. | | |
| 2006/0238406 A1* | 10/2006 | Nohara | ................... | G01S 7/003 |
| | | | | 342/90 |
| 2008/0159413 A1* | 7/2008 | Mehan | ................. | G06F 1/3209 |
| | | | | 375/257 |
| 2008/0246627 A1* | 10/2008 | Guazzelli | ................. | 340/870.02 |
| 2012/0014220 A1 | 1/2012 | Depasqua | | |
| 2013/0085630 A1 | 4/2013 | Ninomiya et al. | | |

FOREIGN PATENT DOCUMENTS

| | | | |
|---|---|---|---|
| JP | 2004150872 A | * | 5/2004 |
| JP | 2004226392 A | | 8/2004 |
| JP | 2013079814 A | | 5/2013 |

OTHER PUBLICATIONS

Hummingbird, 787c2GPS Chartplotter Operations Manual, Nov. 22, 2005, pp. 1-126.*
Extended European Search Report for EP 14177980, dated Jan. 15, 2015.

* cited by examiner

*Primary Examiner* — Hovhannes Baghdasaryan
(74) *Attorney, Agent, or Firm* — Patterson + Sheridan, LLP

(57) ABSTRACT

An integrated fish detection module/navigation module system that may provide the location of fish over a distance or time is provided herein. The location of fish can be presented on a navigation module display to provide information regarding the location of fish relative to navigational data known to the navigation module. The information may create a record of fish location over time and distance. In some configurations, the navigational data and fish detection module data of more than one watercraft may be combined and distributed. In some configurations, a marker may be automatically placed on a navigation module to indicate that fish have been detected at the location on the navigation module.

16 Claims, 5 Drawing Sheets

FISH TRACKER

BACKGROUND

Fish finders are used by both professional and non-professional anglers to find fish or other aquatic animals in the general vicinity below the keel of a watercraft. A conventional fish finder uses sonic waves (sonar) to detect fish. The fish finder typically includes an underwater transducer that receives an electrical signal from a control box to produce a sound at one or more frequencies. The fish finder thereafter detects sound reflecting off fish, or other underwater objects, in the area. The fish finder may then perform a calculation using the speed of sound in water to determine a distance and general location of a fish below the keel of a watercraft. The fish finder may repeat the transmission and reception of reflected sound several times in a short period to provide information about objects in the water below the watercraft.

As the watercraft moves, the fish finder can continually retrieve additional information about objects in the water below the watercraft. A large portion of fish finders used in relatively shallow lakes and rivers have the transmission strength to map the bottom of the lake or river as well as provide information about objects moving into and out of the sound range of the fish finder. Further, depending on the fidelity of the fish finder, the relative size of fish in the water below the watercraft may be determinable. However, the information provided by traditional fish finders is typically limited to real time information corresponding to the environment directly beneath the watercraft.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect, an integrated fish location system is provided. The integrated fish location system may include a fish detection module configured to output a fish detection module output comprising an indication of an underwater object in a general vicinity of a watercraft. The fish detection module may include a transducer. The integrated fish location system may further include a navigation module configured to output navigation module output. The navigation module output may include location information. The navigation module may include a navigational component. The integrated fish location system may further include an integrator configured to integrate the fish detection module output and the navigation module output to provide an integrated output that provides a location of the underwater object.

According to another aspect of the disclosure herein, a display for displaying integrated fish location information is provided. The display may be coupled to a fish detection module portion that includes a fish detection module output. The fish detection module output may include an indication of an underwater object in a general vicinity of a watercraft. The display may also include an integrated output portion that includes an integrated output. The integrated output may include the fish detection module output and a navigation module output. The navigation module output may include location information of the underwater object in a general vicinity of the watercraft. The display may further include navigational information of the watercraft.

According to yet another aspect, a method for providing integrated fish location information is provided. The method may include receiving fish detection module output, receiving navigation module output, integrating the fish detection module output with the navigation module output to create integrated data, and transmitting the integrated data to a display.

The features, functions, and advantages discussed herein can be achieved independently in various embodiments of the present disclosure as taught herein, combinations thereof, or may be combined in yet other embodiments, further details of which can be seen with reference to the following description and drawings.

DETAILED DESCRIPTION

Figure 1:
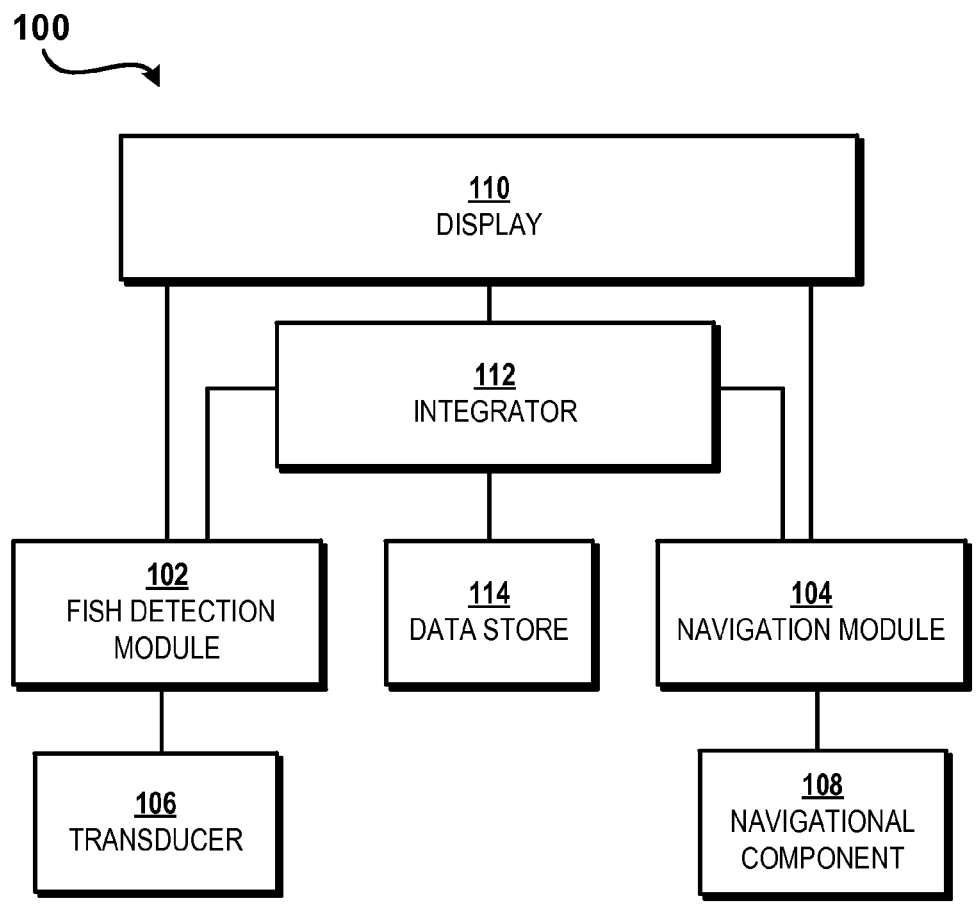
FIG. 1 is system diagram of an integrated navigation module/fish detection module, according to various embodiments.

The following detailed description is directed to a navigation module integrated with a fish detection module. In some configurations, the navigation module/fish detection module combination may provide the location of fish over a distance or time. The location of fish can be presented on a navigation module display or other output to provide information regarding the location of the fish relative to navigational data known to the navigation module. The information may create a record of fish location over time and distance. Users can access the information to determine the location of fish at various times and locations. The navigational data of the watercraft may be used to help the user return to sites in which fish were located. In some configurations, the navigational data and fish detection module data of more than one watercraft may be combined and distributed. In some configurations, a marker may be automatically placed on a navigation module to indicate that fish have been detected at the location on the navigation module.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies for an integrated navigation module/fish detection module and other aspects will be presented.

Referring now to the figures, FIG. 1 is a system 100 configured to integrate fish location data with navigational data. The system 100 may be used on a watercraft to provide a user with navigational data relating to the location of objects below the watercraft. At various times in its operation, the system 100 may send signals to determine the presence of objects below the watercraft. The system 100 may be configured to determine that objects are located under the watercraft. The system 100 may also be configured to determine whether the objects are aquatic life forms or inanimate objects.

The system 100 can include a fish location module 102 and a navigation module 104. The fish location module 102 may be coupled to a transducer 106 configured to transmit sonar waves into the water below the watercraft. In some configurations, the transducer 106 for the fish location module 102 may be a microphone or other sound transmitting device configured to transmit sound waves, or sonar, in a liquid. The transducer 106, or another component of the fish location module 102, may receive reflected sound waves and determine that fish, or other objects, are present in the area of the sound waves. It should be appreciated that the present disclosure is not limited to the detection of fish, as various configurations may be used to detect other aquatic life forms not members of the paraphyletic group of organisms. For example, various implementations of the present disclosure may be used to detect and track whales, shellfish, and the like.

The navigation module 104 may be coupled to a navigational component 108. The navigational component 108 may generate location information for the system 100. The navigational component 108 may be, but is not limited to, a global positioning service (GPS) device, radar, sounding equipment, cellular-based location equipment, and the like. The present disclosure is not limited to any particular type for the navigational component 108. Further, the navigational component 108 is not limited to electronic devices, as location information may be determined using manual means such as clocks, sextants, charts, and geographical marker charts. The system 100 may receive location information from manual and electronic sources. The present disclosure, however, is not limited to any particular source.

The navigation module 104 receives the information from the navigational component 108 and outputs a location. The navigation module 104 may be preloaded with map information or other geographical information so that the location information received from the navigational component 108 may be integrated with the geographical information to place the location information provided by the navigational component 108 in a geographical context. For example, the navigation module 104 may have a digital map of a coastline or waterway. The digital maps may have data associate with particular locations on the map. The information from the navigational component 108 may be associated with the location data to provide a location of the watercraft on the digital map.

The information from the fish location module 102 and the navigation module 104 may be displayed on a display 110. It should be appreciated, however, that the presently disclosed subject matter does not require the use of a display, as other output formats may be used. For example, and not by way of limitation, the information from the fish location module 102 and the navigation module 104 may remain in an electronic format received from the fish location module 102 and/or the navigation module 104. The use of the display 110 may provide some visual benefits to a user of the system 100, such as a captain of the watercraft.

To provide a user with information relating to the location of objects, such as fish or other aquatic animals, the information from the fish location module 102 and the navigation module 104 may be integrated by an integrator 112 of the system 100. The integrator 112 may receive and integrate the sonar information retrieved by the fish location module 102 and the location information determined by the navigation module 104 to create integrated information. The integrated information may be a representation of the sonar information in the location information. For example, the integrated information may be the location of fish in a geographical area. The integrated information may be displayed on the display 110 in a manner similar to a plot for the watercraft, shown by way of example in FIG. 2. For example, locations of fish may be displayed on a map. As the watercraft moves, locations of the same fish or other fish may be displayed on the map in the location of the watercraft.

The integrated information may be stored in data store 114. The data store 114 may be used by the system 100 to display historical information of fish found by the sonar of the fish location module 102 on a map provided by the navigation module 104. In some implementations, this historical information may allow a user using the system 100 to see where fish were located as the watercraft moved through a particular area of interest. In that manner, this may allow the user to return to those areas in an attempt to find the fish again. In addition, the stored information may also include a time at which the fish were located.

This may be beneficial for commercial or recreational anglers. A significant portion of aquatic animals have habitual behavior. That is, the animals tend to act in a consistent behavior over time. The user may be able to use the time and location information on the display 110 to go back to the location at a similar time in which the fish were found. This may increase the probability that the fish will be found.

Figure 2:
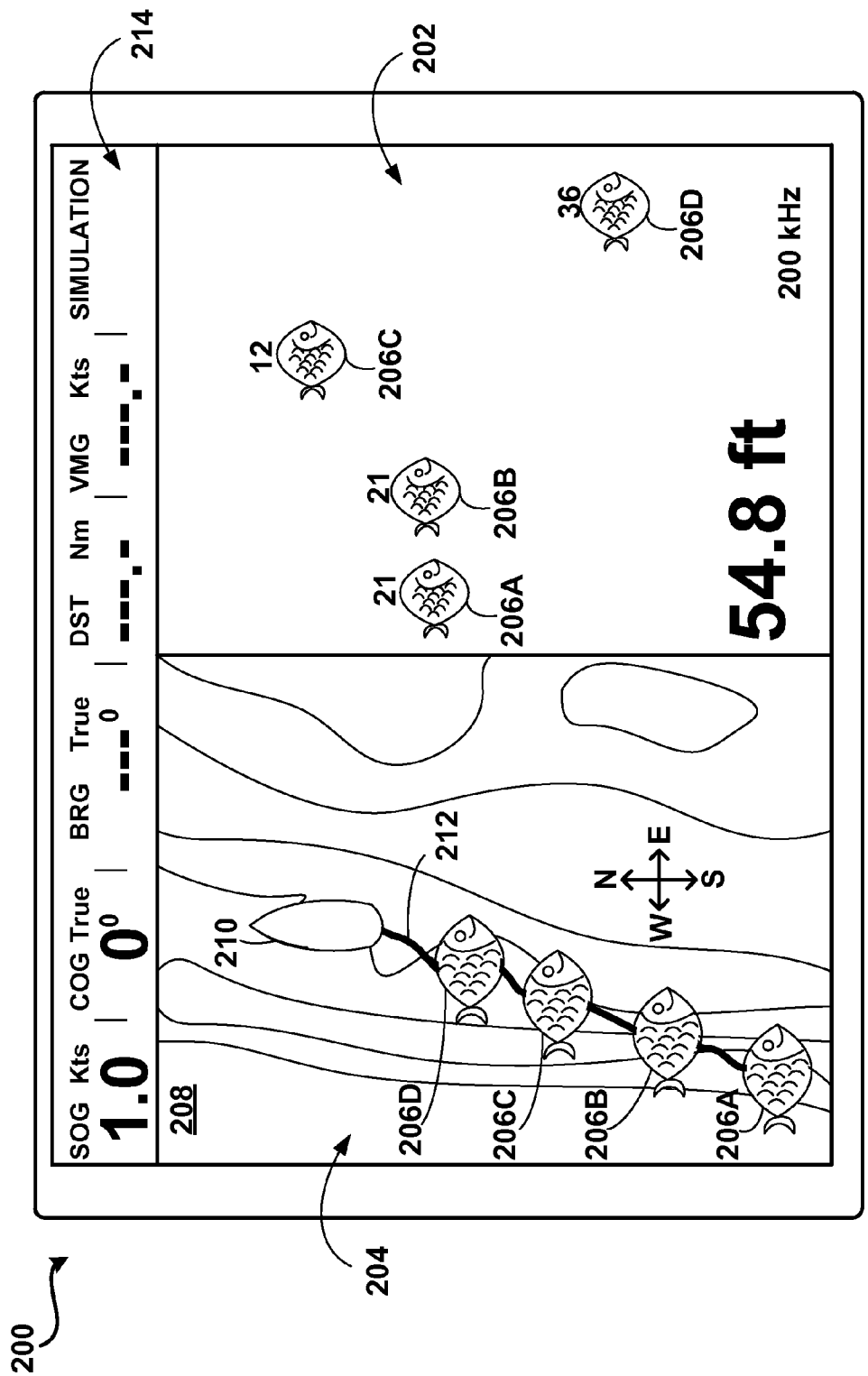
FIG. 2 is a representation of a navigation module chart with integrated fish detection module information, according to various embodiments.

FIG. 2 is an exemplary display 200 for displaying integrated fish detection module and location information. The display 200 is coupled to a fish detection module portion 202 and an integrated output portion 204. The fish detection module portion 202 displays the fish location module 102 output, which may include an indication of one or more underwater objects 206A-206D (collectively referred to herein as "underwater objects 206"). The underwater objects 206 may be detected by the transducer 106 of the fish location module 102. The underwater objects 206 may be in a general vicinity of a watercraft.

In some configurations, the system 100 may be configured to provide information in addition to the indication that the underwater objects 206 are located in the general vicinity of the watercraft. For example, the system 100 may be able to determine, from the information received by the fish location module 102, an identification of a detected fish, a depth of a detected fish, and a size of a detected fish. The system 100 may also be able to determine a date and time at which the underwater objects 206 were located.

For example, the underwater objects 206A and 206B are shown in the fish detection module portion 202 as being at a depth of 21 feet, the underwater object 206C is shown in the fish detection module portion 202 as being at a depth of 12 feet, and the underwater object 206D is shown in the fish detection module portion 202 as being at a depth of 36 feet. This, and other, information may be displayed in the fish detection module portion 202.

The integrated output portion 204 may display an integrated output of an output of the fish location module 102 and an output of the navigation module 104. The output of the navigation module 104 may include location information from the navigational component 108. The navigational component 108 may be, for example and not by way of limitation, a GPS device, radar, sounding equipment, and cellular-based location equipment. The navigational component 108 may also be a clock, a sextant, a chart, and a geographical marker chart.

The output from the navigation module 104 may also include geographical information. The integrated output portion 204 may be placed within the context of a map 208. The map 208 may be used to visually display the position of the underwater objects 206 in relation to a watercraft 210 over a period of time. For example, the movement of the watercraft 210 may be indicated by a plot line 212. The plot line 212 may be provided by the navigation module 104.

The plot line 212 may also provide a visual reference for the underwater objects 206 in relation to a position of the watercraft 210 along the plot line 212. For example, the watercraft 210 may be moving in northern direction. The underwater object 206A may be one of the first objects located and indicated by a marker, such as an icon representing a fish, on the map 208. As the watercraft 210 has moved in the northerly direction, the underwater objects 206B-206D are marked at the locations indicated in the map 208. This information may be stored in the data store 114 for future reference.

For example, a user returning to the area delineated in the map 208 may want to bring up the markers of the underwater objects 206 in that area. The display 200 may automatically retrieve the markers of the underwater objects 206 and may indicate a time or date in which the markers were generated. The user may then navigate the plot line 212 using navigational information 214 in an attempt to fish the area based on the historical data presented by the display 200. If the user is part of a fishing enterprise, the user may want or need data from other integrated location and fish finding systems.

Figure 3:
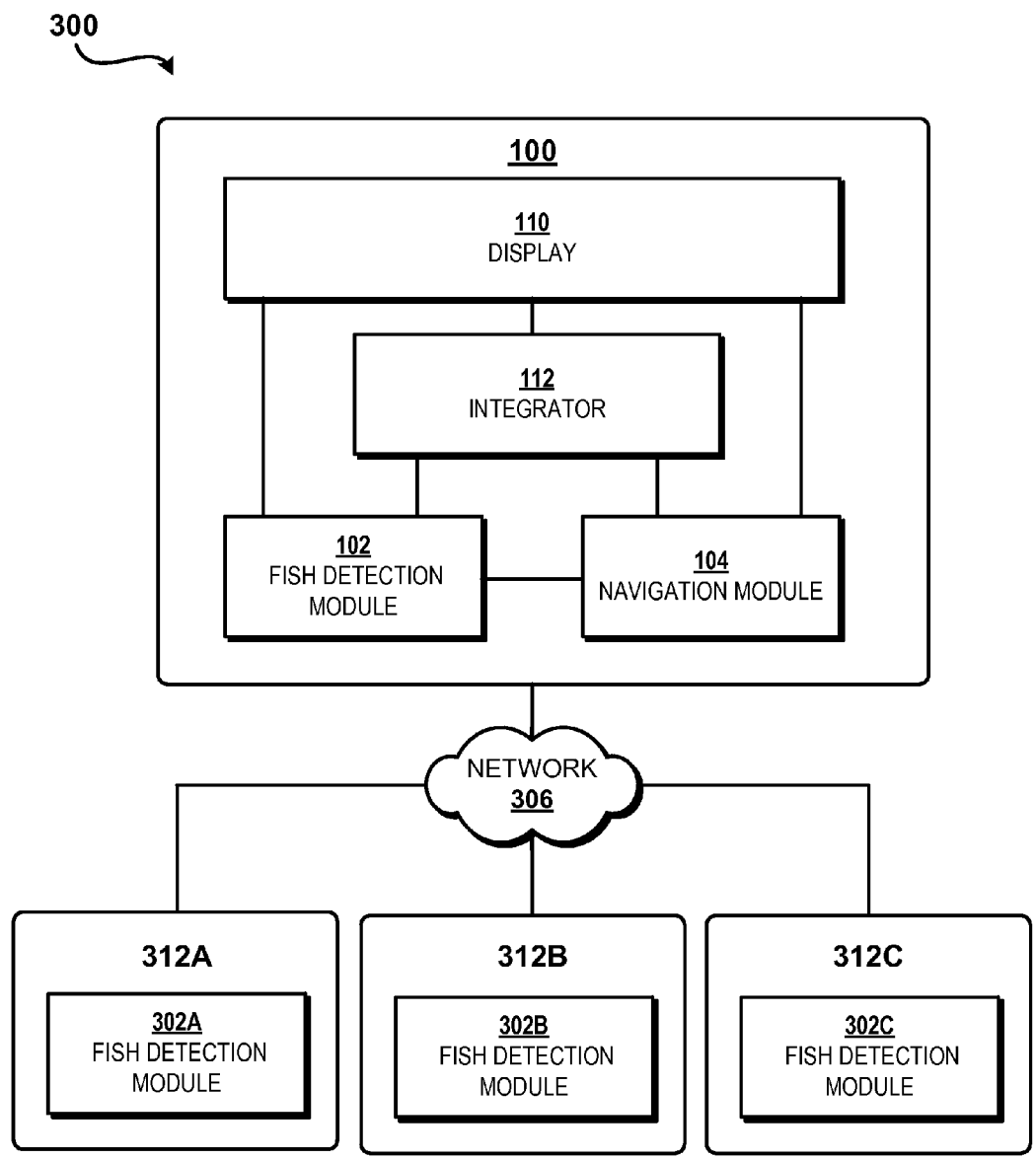
FIG. 3 is an exemplary system for integrating multiple fish detection modules in a navigation module, according to various embodiments.

FIG. 3 is an exemplary system 300 using information from multiple integrated navigation module/fish detection modules. The system 300 includes the system 100 as described in FIG. 1. The system 300 also includes information retrieved from other systems through a network 306. It should be appreciated that the concepts and technologies described herein are not limited to any particular type of network used for the network 306. In some configurations, the network 306 can include the Internet, an intranet, an extranet, or various combinations thereof. The network 306 can also include various types of ship-to-ship and ship-to-shore communication systems capable of implementing various aspects of the disclosure provided herein.

The system 300 receives information from integrators 312A, 312B and 312C (collectively referred to herein as "the integrators 312"). The integrators 312 may be part of other systems similar to the system 100 of FIG. 1. It should be appreciated that the number of the integrators 312 may vary depending on the particular implementation. For example, three integrators 312 are illustrated by way of example in FIG. 3, however, some systems may use more integrators 312 or fewer integrators 312 than what is illustrated in FIG. 3. One implementation may be a fishing fleet. The fleet may have the integrators 312 installed on watercraft in the fleet. The integrators 312 may be communicatively connected to share information among the watercraft of the fleet.

The integrators 312 can be configured to function in a manner similar to the integrator 112. The integrators 112 and 312A-312C may receive and integrate the sonar information retrieved by the fish location module 102 and fish detection modules 302A-302C, respectively. The integrated information from the integrators 312 and 112 may be displayed on the display 110. As the watercraft moves, locations of the same fish or other fish may be displayed on the map in the location of the watercraft. Thus, the integrated information from various integrators, including the integrators 312A-312C, may be shared through the network 306.

In some configurations, the information transmitted to the system 300 via the network 306 may also include raw data directly from a component of another system. For example, the system 300 may receive data from the fish detection modules 302A-302C in a non-integrated state. This data may be useful if it is desirable that the integration of data occur at the local system, such as system 100, rather than at a remote system.

Figure 4:
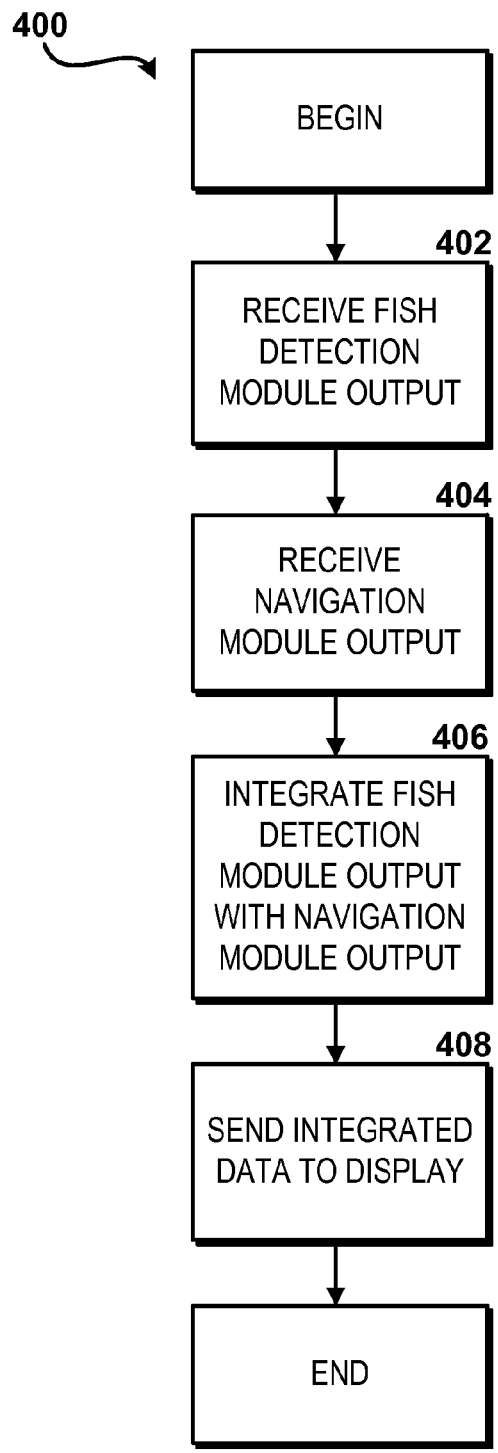
FIG. 4 is an exemplary routine for integrating fish finding information with a navigation module, according to various embodiments.

Turning now to FIG. 4, an illustrative routine 400 for using an integrated fish detection module/navigation module system, such as the system 100, is provided herein. Unless otherwise indicated, it should be appreciated that more or fewer operations may be performed than shown in the figures and described herein. Additionally, unless otherwise indicated, these operations may also be performed in a different order than those described herein.

The routine 400 starts and proceeds to operation 402, where an output from a fish location module 102 is received. The fish detection module output may include the location of underwater objects in the transmission/reception range, or general vicinity, of the watercraft or the fish location module 102. In another configuration, the fish detection module output may include the location of objects in the transmission/reception range of other watercraft or fish detection modules, such as the fish detection modules 302A-302C. In this configuration, the fish detection module output may be shared between multiple integrated systems.

The routine 400 continues from operation 402 to operation 404, where the navigation module output is received. The navigation module output may include location information at the time and date of the data that comprises the fish detection module output. The navigation module output may be generated by a navigational component 108. The navigational component 108 may include a GPS device, radar, sounding equipment, cellular-based location equipment, and the like. The navigational component 108 is not limited to electronic devices, as location information may be determined using manual means such as clocks, sextants, charts, and geographical marker charts.

The routine 400 continues from operation 404 to operation 406, where the fish detection module output and the navigation module output are integrated to form an integrated output. The integrated output may provide a location of the underwater object in relation to the location of the watercraft at the time the fish detection module output was received. In this configuration, the integrated output may be automatically created to provide a user with information about when a fish was detected, at what depth and of what size, depending on the capabilities of the system.

The routine 400 continues from operation 406 to operation 408, where the integrated output is sent to the display 200. The display 200 may be coupled to a fish detection module portion comprising a fish detection module output comprising an underwater object in a general vicinity of a watercraft. The display 200 may also be coupled to an integrated output portion comprising an integrated output comprising the fish detection module output and a navigation module output comprising location information of the underwater object in a general vicinity of a watercraft. The display 200 may further include navigational information of the watercraft.

Figure 5:
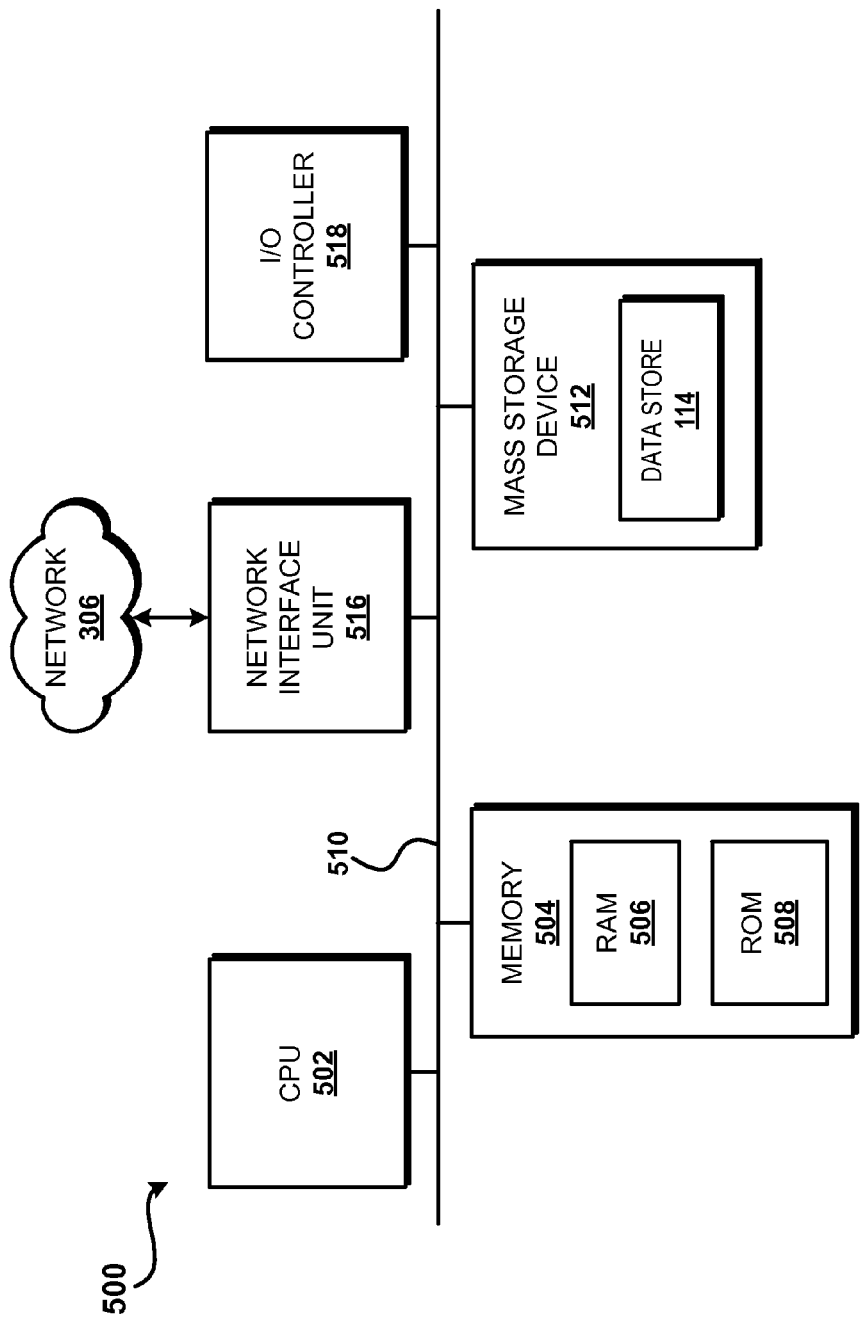
FIG. 5 is a computer architecture diagram showing an illustrative computer hardware and software architecture for a computing system capable of implementing aspects of the embodiments presented herein.

FIG. 5 is an illustrative computer architecture 500 for a device capable of executing the software components described above. Thus, the computer architecture 500 illustrated in FIG. 5 illustrates an architecture for a server computer, mobile phone, a PDA, a smart telephone, a desktop computer, a netbook computer, a tablet computer, and/or a laptop computer. The computer architecture 500 may be utilized to execute any aspects of the software components presented herein. For example, the computer architecture 500 may be used to implement the system 100.

The computer architecture 500 illustrated in FIG. 5 includes a central processing unit ("CPU") 502, a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for providing the data store 114 of FIG. 1.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 500. For purposes of the claims, the phrase "computer storage medium," and variations thereof, does not include waves or signals per se and/or communication media.

According to various embodiments, the computer architecture 500 may operate in a networked environment using logical connections to remote computers through a network such as the network 306. The computer architecture 500 may connect to the network 306 through a network interface unit 516 connected to the bus 510. It should be appreciated that the network interface unit 516 also may be utilized to connect to other types of networks and remote computer systems. The computer architecture 500 also may include an input/output controller 518 for receiving and processing input from a number of other devices, including a keyboard, mouse, or electronic stylus. Similarly, the input/output controller 518 may provide an output to a display screen, a printer, or other type of output device.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that concepts and technologies for distributing applications have been disclosed herein. Although the subject matter presented herein has been described in language specific to computer structural features, methodological and transformative acts, specific computing machinery, and computer readable media, it is to be understood that the subject matter defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, various embodiments of which are set forth in the following claims.

What is claimed is:

1. A fish location system, comprising:
a first integrated fish location system installed on a first watercraft in motion, and a second integrated fish location system installed on a second watercraft in motion, the first integrated fish location system comprising:
   a first fish detection module comprising a first transducer, the first fish detection module configured to output a first fish detection module output comprising a first indication of a first underwater object in a general vicinity of a first watercraft;
   a first navigation module comprising a first navigational component configured to output a first navigation module output comprising first location information;
   a first integrator configured to integrate the first fish detection module output and the first navigation module output to provide a first integrated output that provides a location of the first underwater object; and
   a first display including:
      a fish detection module portion comprising the fish detection module output of the first fish detection module; and
      an integrated output portion comprising the integrated output of the first integrator and navigational information of the first watercraft displayed on a map; and the second integrated fish location system communicatively connected with the first integrated fish location system, the second integrated fish location system comprising:
   a second fish detection module comprising a second transducer, the second fish detection module configured to output a second fish detection module output comprising a second indication of a second underwater object;
   a second navigation module comprising a second navigational component configured to output a second navigation module output comprising second location information;
   a second integrator configured to integrate the second fish detection module output and the second navigation module output to provide a second integrated output that provides a location of the second underwater object, and wherein the second integrator is configured to provide the respective second integrated output in networked communication with the first integrator to provide for the integration of the second integrated output with the first integrated output; and
   a second display including:
      a fish detection module portion comprising the second fish detection module output of the second fish detection module; and
      an integrated output portion comprising the second integrated output of the second integrator and navigational information of the second watercraft displayed on a map,
   wherein the first integrated output and the second integrated output are both displayed on each of the integrated output portions of the first display and the second display while each of the first integrated fish location system and the second integrated fish location system are in motion.

2. The fish location system of claim 1, wherein each of the first integrated fish location system and the second integrated fish location system each further comprise a data store to automatically store respective first fish detection module output and second fish detection module output and the first navigation module output and the second navigation module output.

3. The fish location system of claim 1, wherein each of the first display and the second display are configured to display a marker identifying the location of the underwater object.

4. The fish location system of claim 1, wherein the first navigational component comprises a global positioning service device, radar, sounding equipment, and cellular-based location equipment.

5. The fish location system of claim 1, wherein the first navigational component comprises a clock, a sextant, a chart, and a geographical marker chart.

6. The fish location system of claim 1, wherein the first navigation module comprises map information so that the first location information may be integrated with the map information to place the first location information in a geographical context.

7. The fish location system of claim 1, wherein the first fish detection module output further comprises an identification of a detected fish, a depth of a detected fish, and a size of a detected fish.

8. The fish location system of claim 1, wherein the the first display and the second display are each configured to display a date and time at which the first and second underwater objects were located.

9. The fish location system of claim 2, wherein the first integrated output portion further comprises a marker identifying the location of the underwater object.

10. The fish location system of claim 2, wherein the location information of the first navigation module is received from a global positioning service device, radar, sounding equipment, or cellular-based location equipment.

11. The fish location system of claim 2, wherein the first navigation module output further comprises map information so that the location information of the first navigation module may be integrated with the map information to place the location information in a geographical context.

12. The fish location system of claim 2, wherein the fish detection module portion comprises an identification of fish detected, a depth of fish, and a size of fish.

13. The fish location system of claim 12, wherein the fish detection module portion of each of the first display and the second display further comprises a date at which the underwater object was located.

14. A method for providing integrated fish location information, comprising:
 while a first watercraft and a second watercraft are in motion:
  receiving first fish detection module output from a first integrated fish location system, wherein the first fish detection module output comprises a first indication of a first underwater object in a general vicinity of the first watercraft;
  receiving first navigation module output from the first integrated fish location system, wherein the first navigation module output comprises first location information;
  integrating the first fish detection module output with the first navigation module output to create first integrated data that comprises a first location of the first underwater object;
  displaying the first fish detection module output on a first fish detection module output portion of a first display;
  displaying the first integrated data on a first integrated data portion of the first display, where first integrated data portion of the first display includes a map;
  receiving second fish detection module output from a second integrated fish location system, wherein the second integrated fish location system is communicatively connected with the first integrated fish location system, and wherein the second fish detection module output comprises a second indication of a second underwater object in the general vicinity of the second watercraft;
  receiving second navigation module output from the second integrated fish location system, wherein the second navigation module output comprises second location information;
  integrating the second fish detection module output with the second navigation module output to create second integrated data that comprises a second location of the second underwater object;
  displaying the second fish detection module output on a second fish detection module output portion of a second display, the second display located on the second watercraft;
  displaying the second integrated data on a second integrated data portion of the second display, where second integrated data portion of the first display includes the map;
  integrating the first integrated data and the second integrated data; and
  causing the first integrated data to be additionally displayed on the second integrated data portion of the second display while the second display is in motion on the second watercraft; and
  causing the second integrated data to be additionally displayed on the first integrated data portion of the first display while the first display is in motion on the first watercraft.

15. The fish location system of claim 1, wherein the first integrator and the second integrator are configured to receive integrated data from one another.

16. The fish location system of claim 1, wherein the first integrator and the second integrator are configured to receive raw, non-integrated data from one another.

* * * * *